Oct. 16, 1962 A. W. HODGSON 3,059,175
PHASE-SHIFT NETWORK
Filed June 5, 1958 4 Sheets-Sheet 1

Oct. 16, 1962 A. W. HODGSON 3,059,175
PHASE-SHIFT NETWORK
Filed June 5, 1958 4 Sheets-Sheet 4
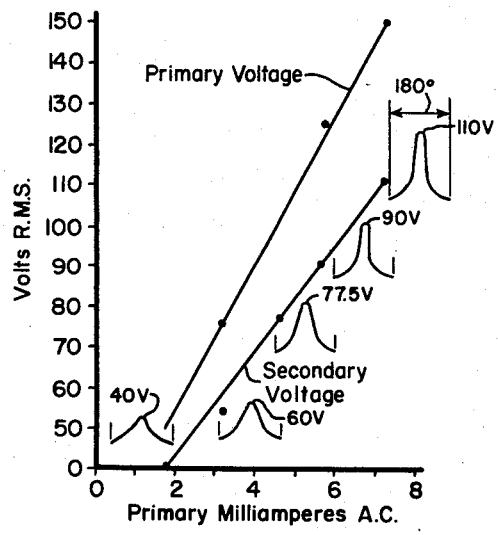
Fig.11.
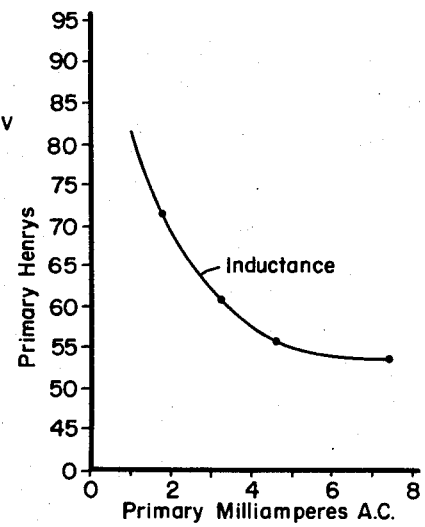
Fig.12.
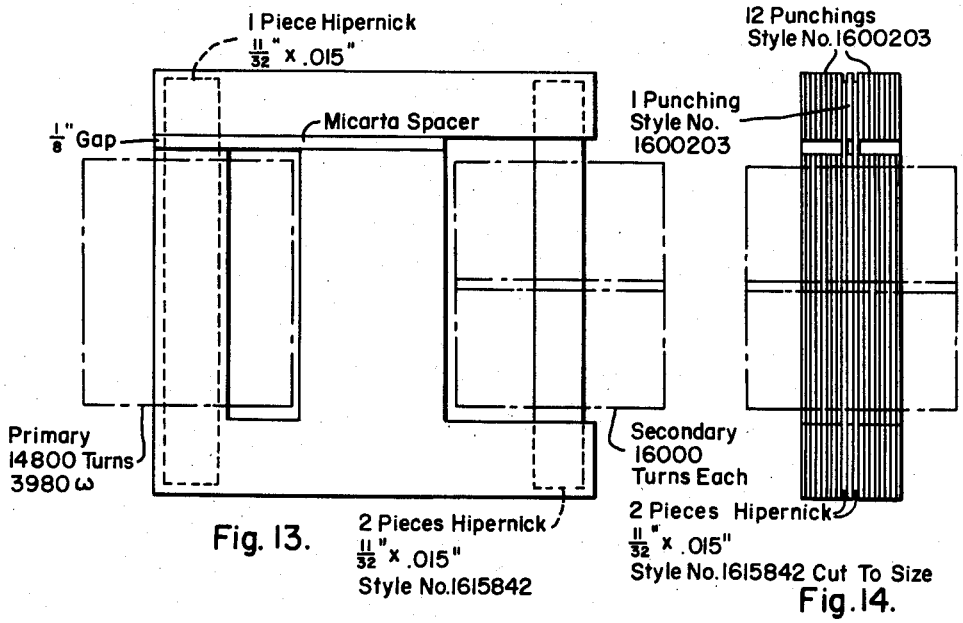
Fig.13.
Fig.14.

United States Patent Office 3,059,175
Patented Oct. 16, 1962

3,059,175
PHASE-SHIFT NETWORK
Alfred W. Hodgson, Orchard Park, N.Y., assignor to Westinghouse Electric Corporation, East Pittsburgh, Pa., a corporation of Pennsylvania
Filed June 5, 1958, Ser. No. 740,038
6 Claims. (Cl. 323—119)

This invention relates to the electric control art, and has particular relationship to apparatus for producing control potentials displaced in phase by predetermined angles with respect to a reference potential.

This invention in its specific aspects arises from the demands of the aircraft industry for test facilities for determining to what extent the skin of aircraft subjected to air resistance will be capable of withstanding the heating produced by the medium through which the craft is moving. The information made available by such facilities is essential as a preliminary to the launching of craft which are to move at very high speeds. Improperly conditioned surfaces subjected to the resistance of the medium with the craft moving at a high speed would readily deteriorate.

Such test facilities in accordance with the present practice include electric discharge devices such as ignitrons, which supply infra red heaters to the radiation from which the skin of the craft is subjected. The conduction of the discharge devices is controlled in accordance with a predetermined schedule, which simulates the effect of the medium, by setting the angles at which the discharge devices are fired in accordance with the schedule. For this purpose phase shift apparatus for precisely controlling the conduction of the discharge devices is necessary and it is broadly an object of this invention to provide such apparatus.

In the electric discharge art it has been customary to control the angle of firing of discharge apparatus with a phase shift network. A typical system in which control of ignitron is effected by a phase shift network is shown by Hartwig, 2,431,248. But prior art apparatus is not satisfactory for the specific purpose at hand because such apparatus is capable only of controlling the conduction of the discharge devices over a range of substantially less than 180° and in the testing of craft, it is desirable that the range be at least 180°.

It is then another object of this invention to provide phase shift apparatus for controlling the firing of electric discharge devices which shall be capable of being set over an angle of at least 180° of the supply potential.

Most actual test runs are controlled by temperature regulators, computers, curve followers or the like. It is then necessary that the phase shift be controlled by means of an error signal voltage.

One of the important objects of the present invention is then to provide a phase shift circuit which can be controlled by a voltage signal.

In the testing of the craft, it is also essential that the conduction of the discharge devices be precisely controlled and it is a further object of this invention to provide phase shift apparatus for achieving such precise control.

A more specific object of this invention is to provide apparatus for achieving highly precise control of discharge devices particularly at low phase displacements with respect to the reference potential.

An incidental object of this invention is to provide a novel peaking circuit for deriving from a sinusoidal alternating supply potential of short duration compared to the period of the supply particularly suitable for controlling discharge devices.

Another incidental object of this invention is to provide a novel peaking transformer.

In accordance with this invention, a phase shift network is provided which includes two sets of dephasing impedances, each set connected in series across the end terminals of alternating supply of commercial frequency and wave form. At least one of the dephasing impedances of one of the sets is variable. It has been found both by analysis and by the construction and testing of apparatus that the potential derivable between the respective junctions of the dephasing impedances has a phase displacement with respect to the supply potential which may be set by setting the variable impedance at any angle over a range exceeding 200°. The phase-displaced potential may be derivable from a variable resistor itself connected between the junction of one of the sets of dephasing impedances and an intermediate terminal of the supply. The resistor may be set to limit the range of phase displacement.

While the variable impedance may in accordance with the broader aspects of this invention be a variable resistor or reactor, it is, in accordance with a further specific aspect of this invention, a high vacuum discharge device which is continuously controllable by setting its grid potential. It has been found that with such a device, the angle of phase shift is precisely controllable and in addition, at low phase displacements, the highest precision is achieved since the rate-of-change of the phase displacement with respect to the control potential of the discharge device is relatively low. Thus for a large change in control potential, only a relatively small change of phase shift is produced at low phase shift angles.

The curve presenting the phase shift as a function of the control potential also has an extended substantially linear portion so that the phase shift apparatus may be set so that the phase shift is linearly proportional to the control potential.

The grid potential may be controlled by a signal derived from a regulator, computer, curve follower or the like. The phase-shift apparatus actually requires a D.-C. control signal, but an A.-C. signal may be taken from the regulating equipment rectified and filtered to provide the necsesary D.-C. control signal. Usually a positive control signal is preferably supplied to regulator to advance the firing angle of the power discharge devices and increase the power output. The phase shift apparatus is then fail safe since the opening of the control circuit from the regulator to phase shifter results in zero power output rather than full power.

The output terminals of the phase shift network are connected to supply the primary of a peaking transformer. In accordance with this invention, the primary is supplied through a network including a capacitor and variable resistance means. This network has a multiple purpose. One of its functions produced primarily by the capacitor is to set the angle at which the peak output of the transformer is produced at approximately 90° with respect to the supply potential for zero phase shift of the phase-shift network. This 90° displacement is necessary for the effective control of the discharge devices controlled from the transformer because the anode-cathode potential of these discharged devices is in phase with the supply. The precision of this setting is aided by the variable resistance means. In addition, the capacitor in combination with the primary of the peaking transformer constitutes a partially tuned series network. The capacitor may then be set to the proper impedance so that the potential drop across the primary is high. A further purpose of the capacitor is to reduce the loading between the output conductors of the phase shift network.

The peaking transformer in accordance with this invention is also of novel structure. This transformer has a core having a plurality of end legs and a central leg interconnected by cross members. One of the end legs consists of only a strip of relatively small cross-section of a material having a substantially rectangular hysteresis loop such as Hypernick alloy, for example, metallically connected between the cross members. The other end leg is composite including a section of ordinary magnetizable iron, and in addition, a strip of the material having a substantially rectangular hysteresis loop which is similar to the strip constituting the first-mentioned leg. The latter strip is metallically connected between the cross members of the core. This composite leg is interrupted by a gap except for the strip metallically connected between the cross members. The center leg of the core is of substantially greater cross-sectional area than the other legs and is interrupted by a gap. The secondary is wound on the end leg which consists of a single strip of the magnetizable material. The primary is wound on the other end leg. The transformer having the above-described core has been found highly effective in producing the precise control.

The novel features considered characteristic of this invention are disclosed generally above. The invention itself both as to its organization and as to its method of operation together with additional objects and advantages thereof will be understood from the following description of a specific embodiment of the invention when read in connection with accompanying drawings, in which:

FIG. 11 is a graph showing the relationship of the primary and secondary voltages of the peaking transformer and also showing the wave forms of the potentials delivered by the secondary voltages;

FIG. 12 is a graph of the inductance of the primary plotted as a function of input current; and FIGS. 13 and 14 are similar to FIGS. 9 and 10 but give the dimensions of a peaking transformer according to this invention which has been constructed and tested and found to operate satisfactorily.

FIGS. 2, 13 and 14 are presented for the purpose of aiding those skilled in the art in practicing this invention and is not intended in any way to restrict the scope of this invention.

Figure 1:
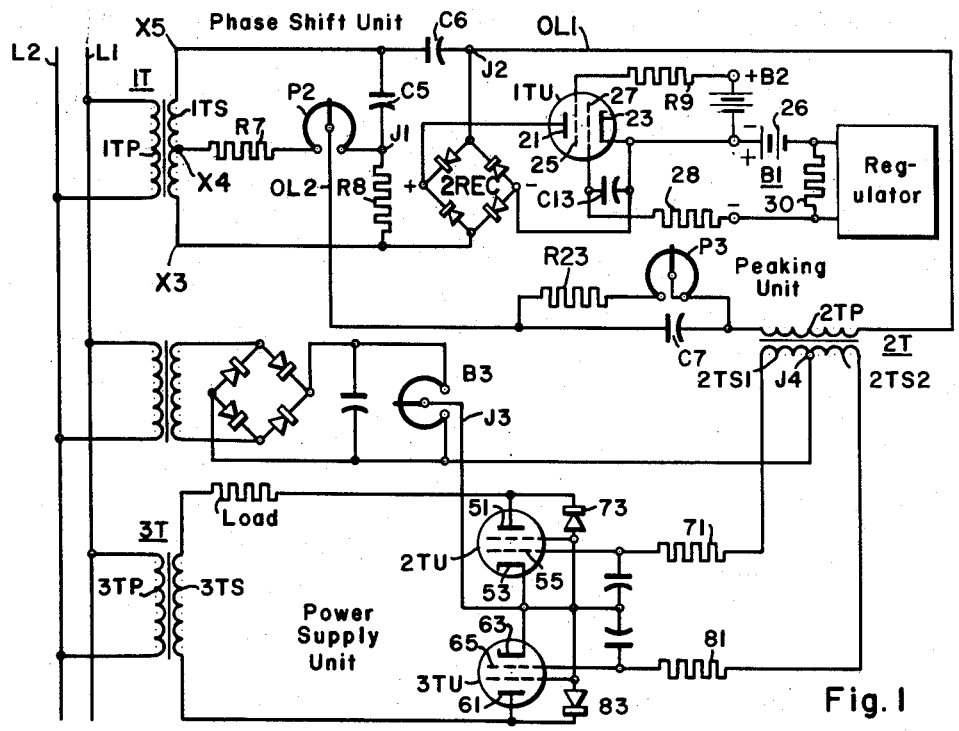
FIGURE 1 is a circuit diagram of a preferred embodiment of this invention.
Figure 2:
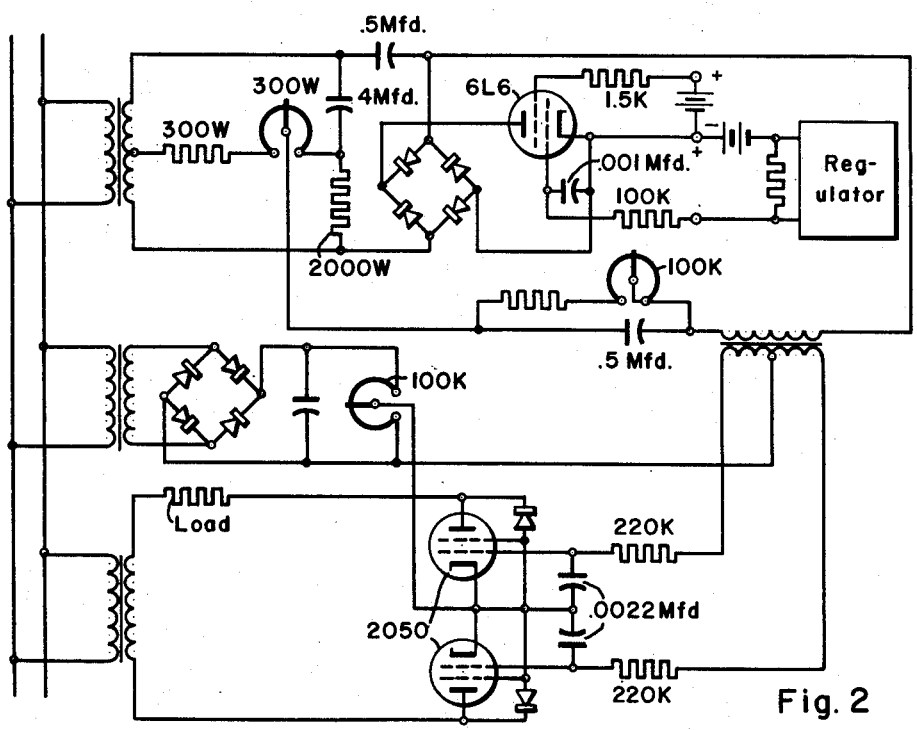
FIG. 2 is a circuit diagram similar to FIG. 1, but showing the magnitudes of the components of apparatus which has been constructed and found to operate highly satisfactorily.
Figure 3:
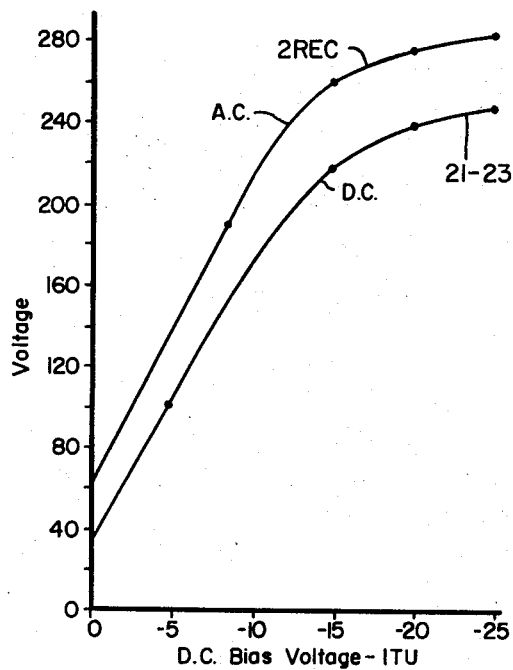
FIG. 3 is a graph of the potential impressed on one part of the phase shift network in accordance with this invention, plotted as a function of the control potential on the discharge device in the phase shift network.
Figure 4:
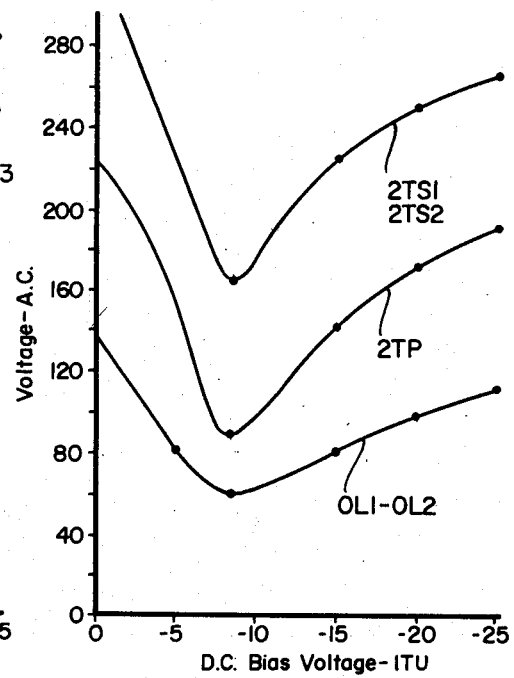
FIG. 4 is a graph of the potentials at the output of the phase shift network and at the input and output of the peaking transformer plotted as a function of the control potential.
Figure 5:
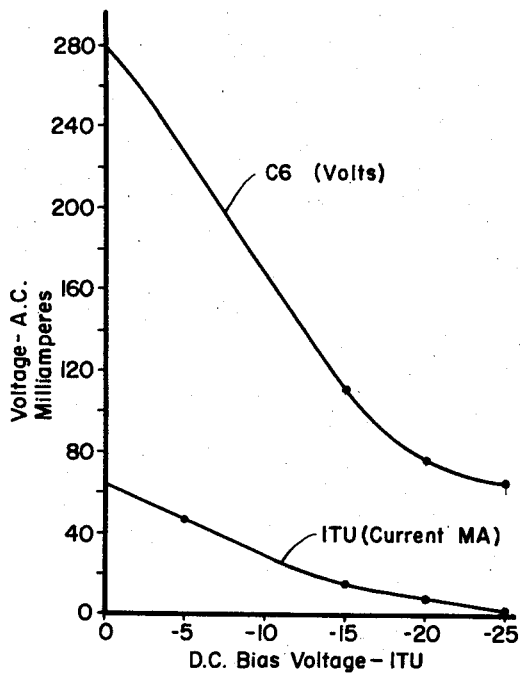
FIG. 5 is a graph of the potentials impressed across certain of the impedances of the phase shift network plotted as a function of the control potential.

The apparatus shown in FIGS. 1 and 2 includes a Power Supply Unit, a Phase Shift Unit and a Peaking Unit. These units cooperate to produce precisely controlled current impulses through a load which may be a part of an aircraft subjected to heating by the medium through which the aircraft moves. The peaking unit is connected to control the conduction of current through the Power Supply Unit by supplying potentials of short duration compared to the period of the source from which the Power Supply Unit is energized. The Phase Shift Unit is connected to the Peaking Unit to determine the instants in the half periods of the source when the potentials of short duration are supplied.

The Phase Shift Unit includes a transformer 1T having a primary 1TP and a secondary 1TS. The primary 1TP may be connected to conductors L1 and L2 which may be energized from the buses of a commercial supply through the usual disconnects or circuit breakers. The secondary 1TS has a pair of end terminals X3 and X5 and an intermediate terminal X4. The Phase Shift Unit also includes a capacitor C5 and a resistor R8 connected in series between the end terminals X5 and X3. A fixed resistor R7 and a variable resistor P2 are connected between the intermediate terminal and the junction J1 of C5 and R8.

This unit further includes a high vacuum electric discharge device 1TU having an anode 21, a cathode 23, a screen grid 25, and a control grid 27. There is also a capacitor C6 and a rectifier 2REC of the full-wave type. The capacitor C6 is connected in series with the alternating current terminals of the rectifier 2REC across the end terminals X5 and X3 of 1TS. The positive pole of the rectifier 2REC is connected directly to the anode 21 of 1TU, the negative pole directly to the cathode 23. For controlling the device 1TU, a direct-current bias network B1 capable of supplying a potential variable at the will of an operator is provided. This bias network B1 includes a potential 26 capable of impressing a blocking bias on the device 1TU. The potential 26 is impressed between the grid 27 and the cathode 23 through high resistors 28 and 30. The potential 26 is capable of being counteracted by the signal potential impressed across resistor 30 either from a manually controlled direct current supply or from a regulator, computer, control curve or the like. The screen grid 25 is connected to the cathode 23 through a grid resistor R9 and a bias potential supply B2 which may be selected to produce the most propitious operation.

The Phase Shift Unit has output conductors OL1 and OL2. Conductor OL2 is connected to the arm of the variable resistor P2 and through the variable resistor to the junction J1. The conductor OL1 is connected to the junction J2 of capacitor C6 and the rectifier 2REC. The portion of the apparatus including the rectifier 2REC and the discharge device 1TU may be regarded as a variable impedance, the magnitude of which may be set by setting the variable bias potential B1. (The device 1TU may be replaced by a variable resistor in accordance with the broader aspects of this invention.)

Figure 9:
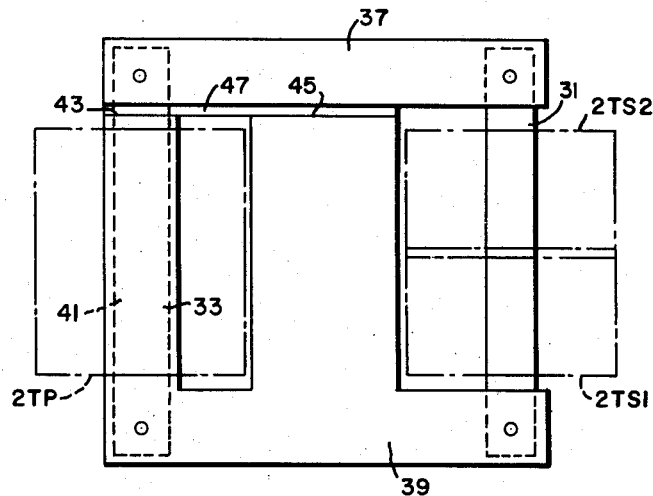
FIG. 9 is a view in front elevation of a peaking transformer in accordance with this invention.
Figure 10:
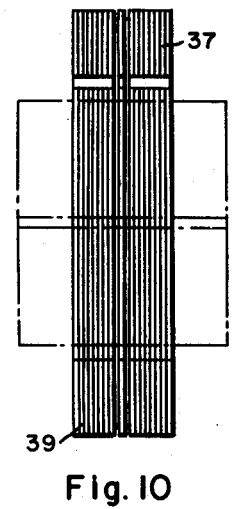
FIG. 10 is a view in section taken along line X—X of FIG. 9.

The Peaking Unit includes a peaking transformer 2T having a primary 2TP and a pair of secondaries 2TS1 and 2TS2. The secondaries are connected to the Power Supply Unit. The transformer 2T is shown in detail in FIGS. 9 and 10. This transformer has a novel core including end legs 31 and 33 and a center leg 35 interconnected by cross members 37 and 39. One of the end legs 31 is of relatively small cross section and is composed of a material having a substantially rectangular hysteresis loop. This leg is metallically connected between the cross members 37 and 39. The other end leg 33 is of substantially greater cross section than the first end leg 31 but also includes a similar strip 41 of material having a substantially rectangular hysteresis loop. This strip is metallically connected to the cross members 37 and 39. Except for the strip 41, the latter leg has a gap 43. The center leg 35 is of substantially greater cross-sectional area than the latter end leg 33 and has a gap 45. A strip of insulating material 47 such as Micarta board, for example, is disposed in the gaps 43 and 45. The primary 2TP is on leg 33 and secondaries 2TS1 and 2TS2 are on leg 31.

The primary 2TP of the peaking transformer is connected between the conductors OL1 and OL2 through a network including capacitor C7, a fixed resistor R23 and a variable resistor P3. The capacitor C7 and the primary 2TP in effect constitutes a series tuned network. The magnitudes of the impedances of C7 and 2TP are such that the part of the potential derived from the conductors OL1 and OL2, which appears across the primary 2TP, is high. The relationship between the magnitudes of C7 and 2TP is also such that the impedance into which conductors OL1 and OL2 feed is substantial and thus the Phase Shift Unit is not unduly loaded. Further, the capacitor C7 operates to shift the phase of the peaks produced across the secondaries 2TS1 and 2TS2 by approximately 90° with reference to corresponding opposite phase potentials impressed between the sections X3—X4, X5—X4 of 1TS.

Figure 8:
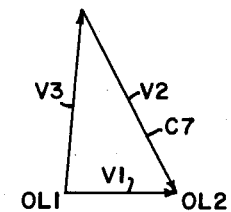
FIG. 8 is a vector diagram illustrating a further aspect of the operation of apparatus in accordance with this invention.

The relationship is illustrated in FIG. 8, which is based in the circuit shown in FIG. 2. The vector V1 represents the potential between the conductors OL1 and OL2, the vector V2, the potential across the capacitor C7 and the vector V3, the potential across the primary 2TP. It is seen that the vector V3 lags the vector V1 by about 85°. For zero phase displacement of V1 with reference to one of the potentials derivable from the secondary 1TS by the Phase Shifting Unit, a displacement (leading with respect to V1) of 85° is then introduced by a capacitor C7.

The Power Supply Unit is energized from a transformer 3T having primary 3TP and secondary 3TS. The primary 3TP may be connected to conductors L1 and L2. The secondary 3TS is connected to supply a Load through a pair of thyratrons 2TU and 3TU. Each thyratron has an anode 51, 61, a cathode 53, 63 and a control grid 55, 65. The anode 51 of thyratron 2TU is connected to the secondary 3TS through the Load. The anode 61 of thyratron 3TU is connected directly to the secondary 3TS. The cathodes 53 and 63 of the thyratron 2TU and 3TU are connected together to junction J3. Each grid 55 and 65 is connected through a grid resistor 71 and 81 and an associated secondary 2TS1 and 2TS2 respectively of the peaking transformer 2T to a common junction J4. The junction J4 is connected through a bias B3 to the common junction J3. Between the anodes and cathodes of each of the thyratrons 2TU and 3TU, a rectifier 73, 83 is connected in inverse parallel. Thyratron 2TU is then capable of conducting current of one polarity through the Load and through the rectifier 83 connected across thyratron 3TU and thyratron 3TU is capable of conducting current of the opposite polarity through the Load and through the rectifier 73 connected across thyratron 2TU. The bias B3 is of such magnitude as to suppress conduction in the absence of peak potentials across either secondary 2S1 or secondary 2S2. The peak potentials have a duration such that each of the thyratrons is in its turn rendered conducting at an instant preset by the setting of the variable bias B1.

Figure 7:
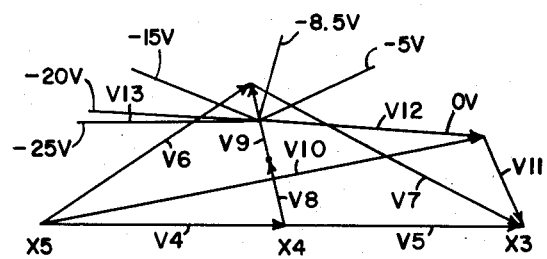
FIG. 7 is a vector diagram illustrating the operation of apparatus in accordance with this invention.

The relationship of the potentials of the Phase Shift Unit is shown in FIG. 7 which is based on FIG. 2. The potentials across the sections X5—X4, and X4—X3 of the secondary 1TS may be represented by the horizontal vectors V4 and V5 assuming the potentials across the sections are referred to point X5. The vectors V6 and V7 representing the potentials across C5 and R8 depend on the magnitudes of the impedances of this capacitor and resistor. Depending on these magnitudes, these vectors extend from the points X5 and X3, respectively, at angles such that their points of intersection lie on a curve. This curve is not a half circle in the case under consideration because of the loading of R7 and P2. In the actual situation represented in FIG. 2 the potential between X4 and J1 is only 85 to 87 volts whereas the potential between X3 and X5 is 300 volts. Preferably, the impedances of C5 and R8 may be generally of the same order. The vectors V8 and V9 corresponding to R7 and P2 extend between X4 and the intersection of V6 and V7. Point OL2 corresponds to the setting of P2.

The impedance across the alternating potential input terminals of rectifier 2REC is dependent on the impedance across the output poles of 2REC, that is on the conduction of device 1TU. The impedance of device 1TU may be varied from the nonconducting condition to the fully conducting condition by varying the bias B1. Vectors V10 and V11 represent the impedances across C6 and 2REC with the bias B1 at zero in the FIG. 2 circuit. The vector V12 corresponding to the output at this setting extends between point OL2 and the intersection of V10 and V11 and is parallel to V5 for a proper setting of P2. For the fully nonconducting setting of 1TU the corresponding vector is V13 which is parallel to V4 for the proper setting of P2. The vectors for intermediate conducting of 1TU extend between V12 and V13. The vectors are labeled with the corresponding biases B1 applied in FIG. 2 to produce the potentials corresponding to the latter vectors. It is seen that the range of points of intersection of the vectors V10 and V11 corresponding to C6 and 2REC is about 150° extending from a point at one end at an angle of about 30° to V5 to a point at the other end at an angle of about 30° to V4. The range of the vectors from point OL2 is about 180°.

FIG. 7 corresponds to the situation in which the arm is set approximately at the center of P2. The range may be varied from more than 200° to somewhat less than 180° by changing P2.

Preparatory to the operation of the apparatus, the resistor P3 is set for the desired phase shift. For this purpose the Phase Shift Unit may be set so that the phase shift is zero. By setting bias B1 so that the conduction of the discharge device 1TU is at a maximum. In a typical situation, this may be effected by impressing zero bias between the control grid 27 and the cathode 23. With the bias B1 properly set, potential may be applied to the transformer 1T. The potential between conductors OL2 and OL1 then has a phase position with reference to the potential between X4 and X3 which is represented by the vector V12 of FIG. 7. This phase position corresponds to zero phase angle and the transformer 2TP is supplied with this potential. The potential is of generally sinusoidal wave form as this potential rises from zero to a relatively small magnitude. A few degrees from a point of zero potential near the beginning of each half period, the flux induced in the core flows through the outer legs 31 and 33; potential of substantial magnitude is then induced in the secondaries 2S1 and 2S2. At a predetermined angle, a few degrees from the zero points, the leg 31 and the strip 41 of the primary leg become saturated so that the flux flows through gap portion of leg 33 and through leg 35 and secondary potential drops to a low magnitude. The secondary potential continues at the very low magnitude until near the end of the half period when the potential is reduced to zero and reversed. The stubs 31 and 41 of the core are then again desaturated and resaturated to the opposite polarity and a substantial potential of the opposite polarity is induced in the secondaries 2TS1 and 2TS2. Potentials of short duration compared to the period of the impressed potential is of peaked wave form and are thus impressed at the beginnings of succeeding half periods of the impressed potential. The potential impressed on the secondaries may be shifted in phase with reference to the impressed potential by the cooperation of the capacitor C7 and the resistors R23 and P3. The resistor P3 may be set to provide the precise phase displacement. The setting is such that the peak potential lags the anode potential impressed by the secondary 3TS on the respective thyratrons 2TU and 3TU controlled from each of the respective secondaries 2TS1 and 2TS2 by the desired angle. The setting is preferably such that the voltage peaks of 2TS1 and 2TS2 lag the corresponding voltage peaks of 3TS by 90° for zero power output—that is, maximum blocking bias on 1TU.

In the use of the apparatus, the bias B1 is set for the desired phase displacement of the Phase Shift Unit. Under the circumstances peak potentials are impressed successively by secondaries 2TS1 and 2TS2 in the control circuit of 2TU and 3TU as the primary 2PT is energized. These potentials are of such magnitude as to counteract the bias B3 at the desired instants during the half-periods during which the potentials on 2TU and 3TU, respectively, are positive and each of these thyratrons is in its turn rendered conducting to supply a pulse of a predetermined magnitude through the Load. In the actual use of the apparatus, the thyratrons 2TU and 3TU may be, respectively connected to fire ignitrons when they are rendered conducting and the apparatus subjected to tests may be heated by the current transmitted by the ignitrons.

For the purpose of testing the operation of this invention, apparatus as shown in FIG. 2 was used. A 1000 ohm resistor was inserted as Load and oscilloscopes were connected across the resistor and also across the secondary 2TS1. The variable resistor P3 was set to produce the 85° displacement shown in FIG. 8. The bias B1 was varied over the range shown in FIG. 7. The parameters used and the results of the tests are tabulated in the following table:

lower end of range to provide fine phase angle adjustment in the 0–15° range. In the event that linear control characteristics are required this can be obtained by operating only on the linear portion of curve.

A preferred Phase Shift Unit is shown in FIG. 1 and includes a center tapped power transformer 1T, resistor-capacitor network R7—P2—R8—C5, series capacitor C6, adjustable impedance network including rectifier 2REC and control vacuum device 1TU, and tuned output network consisting of peaking-transformer winding 2TP, capacitor C7, and resistor R23—P3.

When the negative bias B1 on vacuum device 1TU is a maximum, impedance and voltage drop of vacuum device-rectifier network is, for the 6L6 shown in FIG. 2, about 450% of that of series capacitor C6 and the output voltage between conductors OL1 and OL2 is in phase with X5—X4 of secondary 1TS. When the bias B1 on vacuum tube 1TU is zero, the impedance and voltage of vacuum device-rectifier network is about 20% of that of C6 and the output voltage OL1—OL2 is in phase with X3—X4 of secondary 1TS, that is shifted 180° from the maximum bias position. Since the vacuum device-rectifier network is in effect an adjustable resistance, the phase angle of A.-C. voltage across rectifier 2REC and series capacitor

| D.-C. volts, ma. | | | | A.-C. voltages on Phase-Shift Unit | | | | | | | | | | |
|---|---|---|---|---|---|---|---|---|---|---|---|---|---|---|
| 1TU | | | | 2 rec. | C6 | R7–P2 | 1TS X.4 P2 tap | R8 | C5 | A.-C. output | | | 2TS1 peak to peak volts | Load current, percent full conduction |
| B1 bias volts | Current grid 25 | Plate volts | Plate current, ma. | | | | | | | C7–2TP | C7 | 2TP | | |
| 0 | 14.5 | 33.5 | 65 | 60 | 278 | 86 | 63 | 190 | 155 | 138 | 252 | 223 | 320 | 100 |
| −5 | 6 | 100 | 46.5 | 135 | 228 | 87 | 64 | 192 | 154 | 81 | 164 | 153 | 225 | 90 |
| | | | | | | Minimum voltage output point | | | | | | | | |
| −8.5 | 3.8 | 153 | 35 | 190 | 185 | 87 | 64 | 193 | 152 | 60 | 92 | 88 | 165 | 57 |
| −15 | 1.5 | 218 | 15 | 262 | 111 | 86 | 63 | 193 | 150 | 81 | 160 | 142 | 225 | 10 |
| −20 | .8 | 240 | 7 | 277 | 75 | 85 | 63 | 194 | 150 | 98 | 200 | 173 | 250 | 2 |
| −25 | .25 | 247 | 2 | 283 | 65 | 85 | 63 | 194 | 149 | 112 | 220 | 190 | 265 | 0 |

NOTE.—Voltage and resistance settings: 1TS X3–X5, 300 v A.C. Screen grid supply B2–150 v. Thyratron tube 2TU and 3TU. Bias −50 v. D.C. P2–150 ~. (Range Set For 180°.) P3–80,000 ~. (Set to give 0% conduction at 0° phase shift.)

Figure 6:
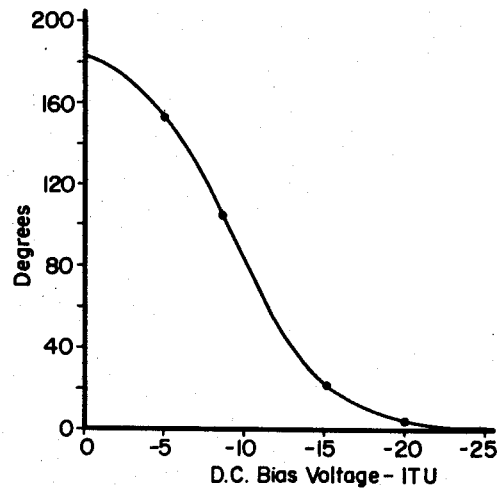
FIG. 6 is a graph showing the manner in which the phase displacement produced with a phase shift network according to the invention varies with the setting of the control potential on the discharge device in the network.

The results of the tests are also illustrated graphically in FIGS. 3, 4, 5, 11 and 12. These views are largely self-explanatory. FIG. 6 shows the phase shift angle as function of the bias B1. It is seen that at low phase shift angles, the curve has a relatively small slope, that is the rate of change of phase shift angle with bias is small. A large change in bias is then required to produce a small change in phase shift. This assures highly precise operation.

By proper adjustment of P2 and P3, linear control of phase shift may also be approached. For example, by setting P2 for the 200° phase shift range and setting P3 so that −15 volts bias gives 0° advance rather than 20°, 0–180° phase shift would be on the linear portions of control curve.

It is also of interest that the range of phase shift is from 0 to 180°. FIG. 11 is also of interest. This view shows how the wave form of the peak impressed on one of the secondaries 2TS1 of transformer 2T varies with the voltage of the secondary. It is seen that even for low voltages a reasonably precise peaked voltage is achieved.

The important features of the invention are summarized in the following paragraphs.

This invention is a phase shifter for use in thyratron firing circuits and includes following features not found in conventional phase shifter units.

(1) Adjustable phase shift range with maximum range in excess of 200°.

(2) Phase shift controlled by a D.-C. input signal making possible phase shift control either manually by means of an adjustable D.-C. input voltage, or automatically by applying a D.-C. error signal derived from controlled apparatus (Power Supply Unit) regulator, computer or control curve, to phase shifter input.

(3) Control curve with non-linear characteristic at

C6 are displaced approximately 90° and point OL1 describes circular arc as the voltage drop across rectifier 2REC is varied from maximum to minimum. At intermediate values of bias voltage, the point OL1 falls on intermediate points along this arc and provides intermediate phase shift angles.

By moving the slider of P2 to the junction of P2 and R7, maximum phase shift may be reduced to values less than 180° and by moving slider of P2 to junction J1 maximum phase shift may be increased to values greater than 180°.

Since the output voltage of peaking transformer 2T must lead the line voltage by as much as 90° at zero phase shift to obtain 0 to 100% power control when thyratron or ignitron tubes are used to energize a resistance load, tuning capacitor C7 has been included to advance the phase angle of peaking transformer primary voltage approximately 90° and resistors R23 and P3 have been included to permit exact phase adjustment to suit the actual load.

The phase shifter circuit was created for use in controlling the firing of ignitron tubes either manually by means of a manual control potentiometer or automatically by a combination analogue computer-regulator which determines desired power level and supplied necessary voltage signal to the phase shifter to obtain the required power output. Other uses for this circuit would be an ignitron or thyratron-tube-controlled resistance welders, power supplies, motor controls, and the like.

While a preferred embodiment has been disclosed herein, it is realized that many modifications thereof are feasible. This invention then is not to be limited except insofar as is necessitated by the spirit of the prior art.

I claim as my invention:

1. A phase-shift network including alternating current power supply means having end terminals, first and second dephasing impedance connected in series between said end terminals, a third impedance including an electric discharge path of the continuously variable type consisting of an anode and a cathode and including a control electrode, biasing potential supply means, control potential supply means, means connected to said control electrode and cathode and to said biasing potential and said control-potential supply means for impressing a control potential and biasing potential in counteracting relationship between said control electrode and cathode to vary the conductivity of said path in dependence upon said control potential thereby to vary said third impedance, a fourth impedance, means connecting said fourth impedance and said third impedance in series between said end terminals, the potentials across said fourth impedance and said third impedance when so connected being dephased, and means connected to the junctions of said first and second impedances and of said third impedance and fourth impedance, respectively, for deriving a potential displaced in phase with reference to the potential between said end terminals in dependence upon the setting of said control potential, said biasing potential being so related to said control potential that the rate of change of the phase displacement with respect to control potential is substantially smaller at low phase displacements than at high phase displacements.

2. A phase-shift network including alternating current power supply means having end terminals and an intermediate terminal, a first capacitor, a first resistor, means connecting said capacitor and resistor in series between said end terminals, said capacitor and resistor having a first junction, a second capacitor, resistive impedance means including an electric discharge path of the continuously variable type consisting of an anode and a cathode and having a control electrode, means connected to said control electrode and cathode for impressing a control potential between said control electrode and cathode to vary the magnitude of said impedance, means connecting said second capacitor and said impedance in series between said end terminals, said second capacitor and said impedance having a second junction, a second resistor connected between said first junction and said intermediate terminal, said second resistor being variable at the will of an operator, and means connected between said second resistor and said second junction for deriving a potential displaced in phase by an angle dependent on the magnitude of said control potential.

3. A phase-shift network including alternating current power supply means having end terminals, a first capacitor, a first resistor, means connecting said capacitor and resistor in series between said end terminals, said capacitor and resistor having a first junction, a second capacitor, second resistance means including an electric discharge path of the continuously variable type consisting of an anode and a cathode and having a control electrode, biasing potential supply means, control potential supply means, means connected to said control electrode and cathode and to said biasing potential and said control potential supply means for impressing said control potential and said biasing potential in counteracting relationship between said control electrode and cathode to vary the magnitude of said resistance means in dependence upon said control potential, means connecting said second capacitor and said resistance means in series between said end terminals, said second capacitor and said resistance means having a second junction, and means connected between said first junction and said second junction for deriving a potential displaced in phase by an angle dependent on the magnitude of said control potential, said biasing potential being so related to said control potential that the rate of change of phase displacement with respect to control potential is substantially smaller at low phase displacement than at high phase displacement.

4. A phase-shift network including alternating current power supply means having end terminals, first and second dephasing impedances connected in series between said end terminals, a rectifier bridge having first opposite terminals at which an alternating current is impressed and second opposite terminals from which a direct current is derived, an electric discharge path of the continuously variable type consisting of an anode and a cathode and including a control electrode, means connecting said anode and cathode in direct current power deriving relationship with said second terminals, means connected to said control electrode and cathode for impressing a control potential between said control electrode and cathode to vary the conductivity of said path, a third impedance, means connecting said third impedance and said first terminals in series between said end terminals, the potentials across said third impedance and said first terminals when so connected being dephased, and means connected to the junctions of said first and second impedances and of said third impedance and the one of said first terminals electrically nearest said third impedance, respectively, for deriving a potential displaced in phase with reference to the potential between said end terminals in dependence upon the setting of said control potential, said deriving means including means for limiting the range of said phase displacement, and said impressing means including means for setting the rate of change of the phase displacement with respect to said control potential of said path substantially linear over substantially the whole of said range.

5. A phase-shift network including alternating current power supply means having end terminals and an intermediate terminal, a first capacitor, a first resistor, means connecting said capacitor and resistor in series between said end terminals, said capacitor and resistor having a first junction, a second capacitor, resistive impedance means including an electric discharge path of the continuously variable type consisting of an anode and a cathode and having a control electrode, biasing potential supply means, control potential supply means, means connected to said control electrode and cathode for impressing said biasing potential and said control potential in counteracting relationship between said control electrode and cathode to vary the magnitude of said impredance means, means connecting said second capacitor and said impedance means in series between said end terminals, said second capacitor and said impedance means having a second junction, a second resistor connected between said first junction and said intermediate terminal, said second resistor being variable at the will of an operator, and means connected between said second resistor and said second junction for deriving a potential displaced in phase by an angle dependent on the magnitude of said control potential, said second resistor being so set with respect to said biasing potential and said control potential that the phase displacement varies as a linear function of the control potential over the range of variation of said phase of said derived potential.

6. A phase-shift network including alternating current power supply means having end terminals and an intermediate terminal, first and second dephasing impedances, means connecting said impedances in series between said end terminals, said impedances having a first junction, a third impedance including an electric discharge path of the continuously variable type consisting of an anode and a cathode and having a control electrode, means connected to said control electrode and cathode for impressing a control potential between said control electrode and cathode to vary the magnitude of said third impedance, a fourth impedance, said fourth impedance and said third impedance being dephasing impedances, means connecting said third and fourth impedances in series between said end terminals, said third and fourth impedances having a second junction, a variable impedance connected between said first junction and said intermediate terminal, said variable impedance being variable at the will of an operator, and means connected between said variable impedance and said second junction for deriving a potential displaced in phase by an angle dependent on the magnitude of said control potential, said variable impedance being so set with respect to said biasing potential and said control potential that the phase displacement varies as a linear function of the control potential over the range of variation of said phase of said derived potential.

References Cited in the file of this patent

UNITED STATES PATENTS

| | | |
|---|---|---|
| 1,901,694 | Bedford | Mar. 14, 1933 |
| 2,005,892 | Gulliksen | June 25, 1935 |
| 2,020,961 | Quarles | Nov. 12, 1935 |
| 2,189,569 | Moe | Feb. 6, 1940 |
| 2,264,695 | Gulliksen | Dec. 2, 1941 |
| 2,370,287 | Biuens | Feb. 27, 1945 |
| 2,387,943 | Putman | Oct. 30, 1945 |
| 2,458,644 | Ringer | Jan. 11, 1949 |
| 2,474,886 | Bovey | July 5, 1949 |
| 2,564,559 | Canfora | Aug. 14, 1951 |
| 2,627,598 | Browder et al. | Feb. 3, 1953 |
| 2,632,798 | Somerville | Mar. 24, 1953 |
| 2,665,407 | Elliot | Jan. 5, 1954 |